US009749974B2

(12) United States Patent
Qi et al.

(10) Patent No.: US 9,749,974 B2
(45) Date of Patent: Aug. 29, 2017

(54) METHODS AND ARRANGEMENTS FOR FRAME TRANSMISSIONS

(71) Applicant: Intel IP Corporation, Santa Clara, CA (US)

(72) Inventors: Emily H. Qi, Gig Harbor, WA (US); Po-Kai Huang, Santa Clara, CA (US); Minyoung Park, Portland, OR (US); Adrian P. Stephens, Cambridge (GB)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 13/931,921

(22) Filed: Jun. 29, 2013

(65) Prior Publication Data

US 2014/0198783 A1 Jul. 17, 2014

Related U.S. Application Data

(60) Provisional application No. 61/753,108, filed on Jan. 16, 2013.

(51) Int. Cl.
*H04W 56/00* (2009.01)
*H04W 74/08* (2009.01)
*H04L 7/04* (2006.01)

(52) U.S. Cl.
CPC ......... *H04W 56/0015* (2013.01); *H04L 7/04* (2013.01); *H04W 56/00* (2013.01); *H04W 74/08* (2013.01)

(58) Field of Classification Search
CPC .............. H04W 56/0015; H04W 56/0025
See application file for complete search history.

(56) References Cited

U.S. PATENT DOCUMENTS 8,233,456 B1 7/2012 Kopikare et al.
8,649,816 B2 * 2/2014 Song .............. H04W 52/0245
370/252

(Continued)

FOREIGN PATENT DOCUMENTS

TW     I262007 B      9/2006
WO   2014/113514 A1   7/2014

OTHER PUBLICATIONS

International Search Report and Written Opinion received for PCT Patent Application No. PCT/US2014/011747, mailed on Apr. 29, 2014, 11 pages.

(Continued)

*Primary Examiner* — Michael Thier
*Assistant Examiner* — Zhensheng Zhang

(57) ABSTRACT

Logic to "loosely" manage synch frame transmissions in a synch network via the devices synced to the network that implement the logic. Logic may distributedly adjust the frequency of attempting synch frame transmissions without estimating the size of the neighborhood. Logic in devices of a synch network to let each device maintain a Transmission Window (TW). Logic to determine the frequency of attempting synch frame transmissions based upon the TW. Logic to increase TW if the device detects a synch frame transmission. Logic to decrease TW if the device successfully transmits a synch frame. Logic to balance power consumption and discovery timing by adjusting the decrease in TW responsive to a synch transmission in relation to the increase in TW responsive to detection of a synch transmitted by another device.

21 Claims, 5 Drawing Sheets

(56) References Cited

U.S. PATENT DOCUMENTS

| | | | |
|---|---|---|---|
| 8,867,512 B2* | 10/2014 | Li et al. | 370/338 |
| 2002/0163933 A1* | 11/2002 | Benveniste | 370/465 |
| 2007/0297414 A1* | 12/2007 | Gupta et al. | 370/395.4 |
| 2008/0031208 A1 | 2/2008 | Abhishek et al. | |
| 2009/0287827 A1 | 11/2009 | Horn et al. | |
| 2010/0260085 A1 | 10/2010 | Wang et al. | |
| 2011/0041965 A1 | 2/2011 | Hoshino et al. | |
| 2011/0064012 A1 | 3/2011 | Abhishek et al. | |
| 2011/0141965 A1 | 6/2011 | Kasslin et al. | |
| 2011/0182171 A1 | 7/2011 | McNew et al. | |
| 2011/0189972 A1* | 8/2011 | Sato et al. | 455/404.1 |
| 2014/0119357 A1* | 5/2014 | Abraham et al. | 370/338 |

OTHER PUBLICATIONS

International Preliminary Report on Patentability (Chapter I of the Patent Cooperation Treaty) received for PCT Patent Application No. PCT/US2014/011747, mailed on Jul. 21, 2015, 6 pages.

Office Action received for Taiwan Patent Application No. 103100636, mailed on Aug. 20, 2015, 3 pages of Taiwan Office Action including search report only.

Notice of Allowance received for Taiwanese Patent Application No. 103100636, mailed on May 30, 2016, 2 Pages of Notice of Allowance and 1 Page of English Translation.

Extended European Search Report received for European Patent Application No. 14741161.5, mailed Aug. 22, 2016, 6 pages.

* cited by examiner

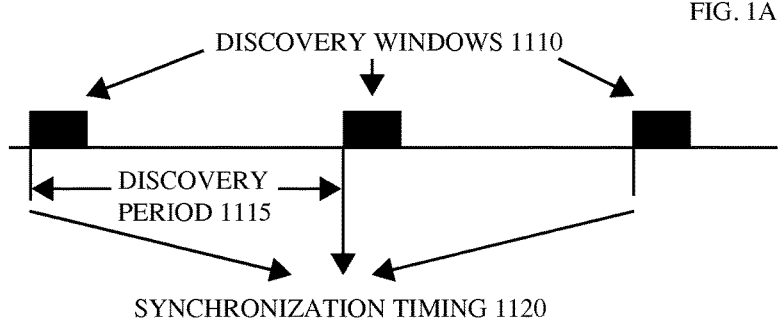
FIG. 1A
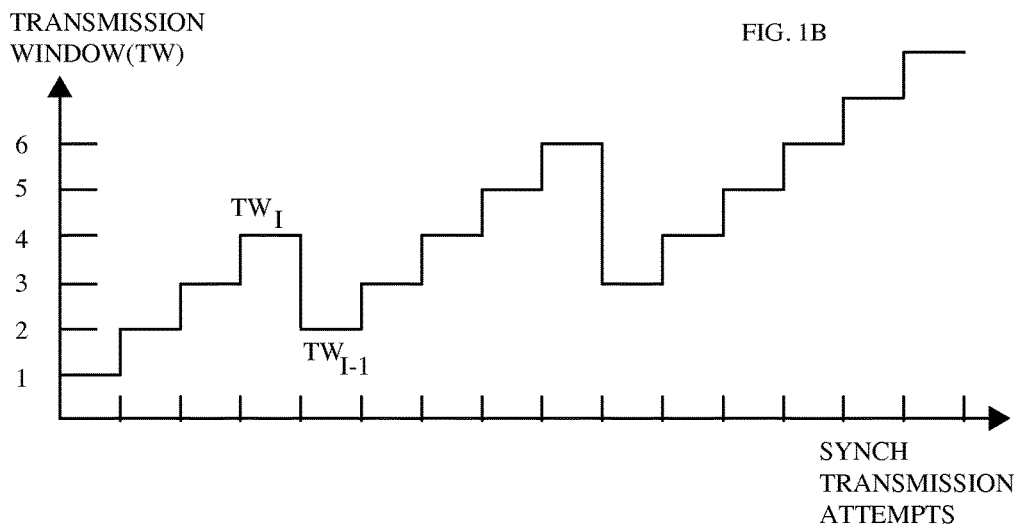
FIG. 1B
FIG. 1C
| NUMBER OF DEVICES → N | 25 | 50 | 75 | 100 | 125 | 150 |
|---|---|---|---|---|---|---|
| EXPECTED TW → E[TW] | 8.46 | 12.5 | 16 | 18.2 | 20.7 | 22.98 |
| $2(N-1)E[\frac{1}{TW}]$ | 9.71 | 12.95 | 14.79 | 16.52 | 18.53 | 19.24 |
| $\sqrt{2(N-1)}$ | 6.92 | 9.89 | 12.16 | 14.07 | 15.75 | 17.26 |
| $\sqrt{2(N-1)\frac{b}{4}}$ | 23.5 | 42.29 | 50.52 | 57.8 | 76.13 | 82.33 | ns and arrangements for frame transmissions

TECHNICAL FIELD

Embodiments are in the field of wireless communications. More particularly, embodiments are in the field of communications protocols between wireless transmitters and receivers for transmitting synch frames.

BACKGROUND

Wi-Fi has become a ubiquitous wireless accessing technique for the mobile devices, and this trend has led to the need for Wi-Fi enabled mobile devices to discover each other. To achieve this goal, a starting point is for the mobile devices in a neighborhood to agree on specific synchronization timing. With the synchronization timing, the discovery window can be defined such that stations (STAs) can awake in the discovery window to discover each other. The STAs that follow the same synch timing will form a synch network.

Currently, in order to let a new device follow the timing of an existing synch network, some devices in the synch network are required to attempt for the synch frame transmission at each discovery window. Further, to avoid congestion, a device will do random backoff before each synch frame transmission, and if a device overhears a synch frame transmission before the backoff period expires, it will not transmit the synch frame.

BRIEF DESCRIPTION OF THE DRAWINGS

FIG. 1A depicts an embodiment of a discovery period with a discovery window to synchronize timing in peer-to-peer communications;

FIG. 1B depicts an embodiment of a graph of transmission window size versus time;

FIG. 1C depicts an embodiment of table of results of transmission window sizes for the simulation described with respect to FIG. 1B for different numbers of devices involved with peer-to-peer communications;

DETAILED DESCRIPTION OF EMBODIMENTS

Figure 1:
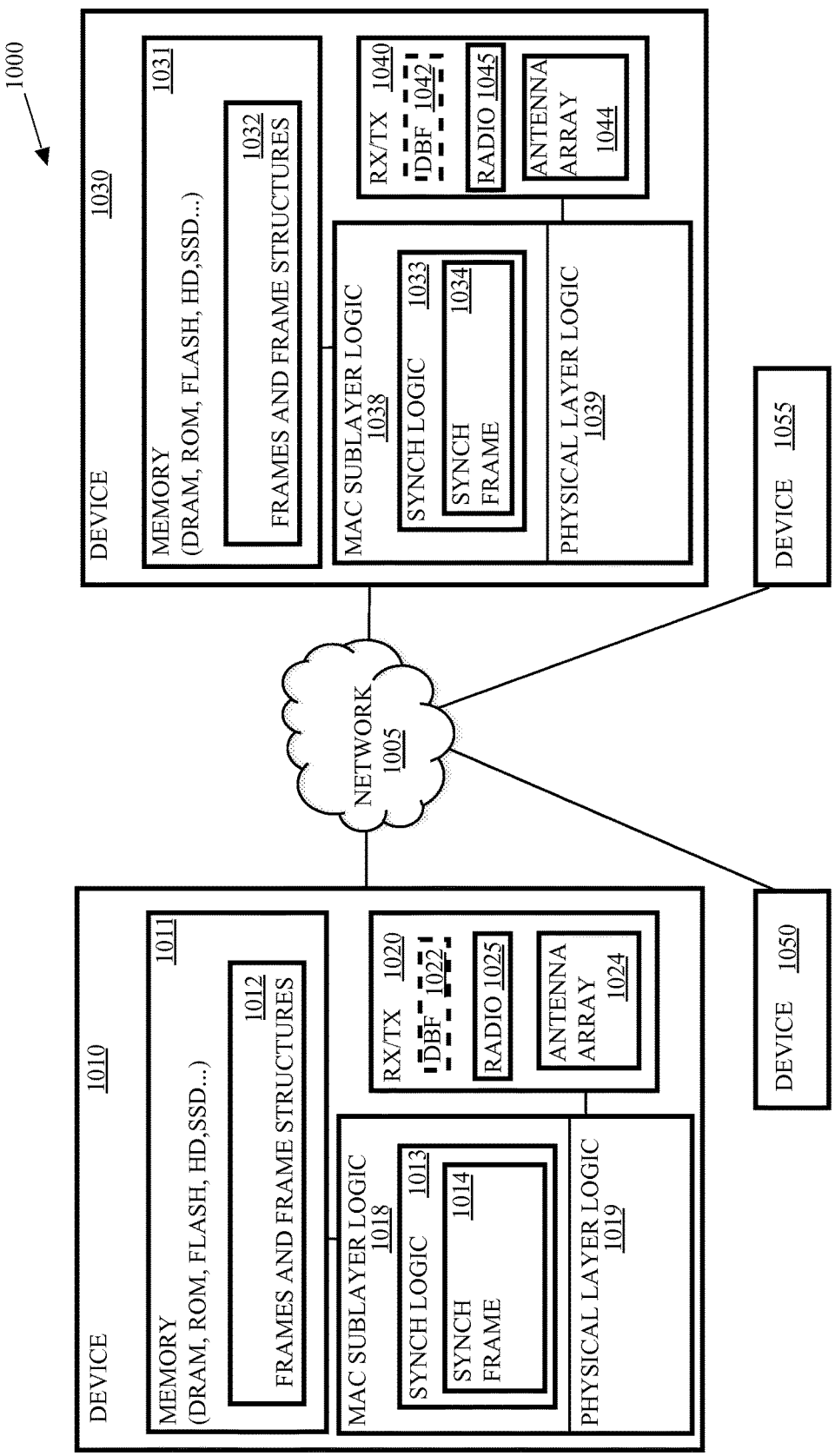
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may enable a number of Wireless Fidelity (Wi-Fi) enabled devices to synch Peer-to-Peer connectivity to allow users to connect their devices to, e.g., share, show, print, and synchronize content. Some embodiments may "loosely" manage synch frame transmissions in a synch network via the devices synced to the network that implement synch logic. Synch logic may distributedly adjust the frequency of attempting synch frame transmissions without estimating the size of the neighborhood. Synch logic in devices of a synch network may let each device maintain a Transmission Window (TW) and determine the frequency of attempting synch frame transmissions based upon the TW. In many embodiments, the synch logic may increase TW if the device detects a synch frame transmission and decrease TW if the device successfully transmits a synch frame. In several embodiments, the synch logic may balance power consumption and discovery timing by adjusting the decrease in TW responsive to a synch transmission in relation to the increase in TW responsive to detection of a synch transmitted by another device.

In some embodiments, the synch logic may implement a first function to decrease TW in response to transmitting a synch frame and a second function to increase TW in response to an attempt to transmit a synch frame that does not result in the transmission of a synch frame due to detection of a synch frame transmitted by another device. In many embodiments, the first function and/or second function may be linear functions or quadratic functions.

In several embodiments, communications devices in a synch network may share the responsibilities of transmitting synch frames to maintain synchronization amongst the devices associated with the network. In many embodiments, one or more of the devices may be mobile devices and the network may be a peer-to-peer network. Mobile devices may operate off of battery power at least part of the time so embodiments may accommodate the battery powered devices by establishing a distribution of the task of transmitting synch frames. The distribution may allow multiple devices to awake for only some of the discovery periods rather than awaking for all discovery periods.

In many embodiments, the synch logic may be implemented in each device in a synch network. The synch logic may establish an initial value of TW and, in several embodiments, a minimum value for TW. In some embodiments, the value of TW may represent a number of discovery periods that a device may wait between attempts to transmit synch frames. A device may awake from a power-save mode, for instance, at a discovery period. The synch logic of the device may establish a backoff period, which is the time period during a discovery window of the discovery period during which the device will wait and monitor the medium for synch frames prior to transmitting a synch frame. In several embodiments, the backoff period may be randomly determined to be a time between the beginning and end of the discovery window.

If the device detects a synch frame transmitted by another device in the synch network prior to the expiration of the backoff period, the device may not transmit a synch frame and the synch logic may increase the value of TW. In many embodiments, the synch logic may increase the value of TW based upon an assumption that there may be many devices in the neighborhood associated with the synch network. The increase in the value of TW increases the potential wait between synch frame transmission attempts by the device. In several embodiments, the increase in TW may be in accordance with a predetermined function, I(x). In some embodiments, constants in the I(x) function or the function I(x) itself may be varied to adjust a balance between power consumption and discovery timing. In other embodiments, the I(x) functions may vary device to device in the synch network based upon a predetermined balance of power consumption and discovery timing. In further embodiments, the devices in the synch network may all adhere to the same, specified I(x) function to increase TW.

If the device does not detect a synch frame prior to the expiration of the backoff period, the device may transmit a synch frame and the synch logic may decrease the value of TW. In many embodiments, the synch logic may decrease the value of TW based upon an assumption that there may not be many devices in the neighborhood associated with the synch network. The decrease in the value of TW decreases the potential wait between synch frame transmission attempts by the device. If the device is the only device in the synch network, for instance, then the value of TW for the device may decrease to TW equals one discovery period meaning that the device may attempt to transmit a synch frame every discovery period. In several embodiments, the decrease in TW may be in accordance with a predetermined function D(x). In some embodiments, constants in the D(x) function or the function D(x) itself may be varied to adjust a balance between power consumption and discovery timing. In other embodiments, the D(x) function may vary device to device in the synch network based upon a predetermined balance of power consumption and discovery timing. In further embodiments, the devices in the synch network may all adhere to the same, specified D(x) function to decrease TW.

In some embodiments, the synch logic may determine the next discovery period that the device may attempt to transmit a synch frame based upon the current value of TW. After the value of TW is increased or decreased, for instance, some embodiments may determine a selection number to determine the number of discovery periods before the next attempt to transmit a synch frame. In some embodiments, the synch logic may determine a selection number by generating a random number (r) that is an integer between the minimum TW and the current TW. In other embodiments, the synch logic may determine a selection number by selecting a subsequent number (r) in a predetermined sequence of numbers. The synch logic may then use the selection number (r) to evaluate a function to determine the time period to wait before the next attempt to transmit a synch frame. In several embodiments, the synch logic may implement a function such as Wait period equals the time of the latest synch frame timing (t) plus the selection number (r) times the discovery period (Wait Period=t+rT).

In several embodiments, the value of TWmin depends on the requirement of discovery time. If a new device needs to discover the synch network faster, the value of TWmin should be smaller. If a new device does not need to discovery the faster, the value of TWmin can be larger.

The functions D(x) and I(x) may determine how fast the synch transmissions are spread when there are many devices and how quickly a station adjusts the TW when some devices leave the network. Some embodiments implement an additive increase and multiplicative decrease such as an increase function of I(x)=x+1 and a decrease function of D(x)=x/2.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Several embodiments comprise devices such as routers, switches, servers, workstations, netbooks, mobile devices (Laptop, Smart Phone, Tablet, and the like), as well as sensors, meters, controls, instruments, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. In many embodiments, the network 1005 may represent a logical affiliation of the devices 1010, 1030, 1050, and 1055 in a synch network such as an association with a peer-to-peer (P2P) group. In other embodiments, the devices 1010, 1030, 1050, and 1055 may physically connect to a network infrastructure but have the capabilities of peer-to-peer communications.

The communications device 1010 may communicate wirelessly with a plurality of communication devices 1030, 1050, and 1055. The communications device 1010 may comprise a mobile phone. The communications device 1030 may comprise a low power communications device such as a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed.

Initially, the communications devices 1010 and 1030 may comprise synch logic 1013, 1033 that determines to attempt to transmit synch frames 1014, 1034 at the same discovery period 1115 in a discovery window 1110 illustrated in FIG. 1A. The synch frames 1014, 1034 may be similar to beacon frames but may comprise shortened or may comprise less fields. In the present embodiment, the synch frame may comprise a network identification for the synch network as well as, in some embodiments, timing coordination to identify the synchronization timing 1120.

The communications devices 1010 and 1030 may awake from a power-save mode to an active mode prior to the start of the discovery window and the synch logic 1013, 1033 may determine backoffs for the respective communications devices 1010, 1030. In many embodiments, the synch logic 1013,1033 may determine the backoffs as a random time period that is within the bounds of the discovery window. The bounds of the discovery window may be predetermined per a specification or determined by a communications device 1010, 1030 and communicated to other devices of the synch network via the synch frames 1014,1034 and stored in memory 1011, 1031.

In several embodiments, the randomness of the generation of the backoffs cause the backoffs generated by the communications devices 1010, 1030 to be different so that the backoff of, e.g., communications device 1010 expires prior to the expiration of the backoff of the communications device 1030. In several embodiments, if the backoff for the communications device 1010 expires and the communications device 1010 did not detect transmission of another synch frame 1034 within the backoff period, the communications device 1010 may proceed to transmit the synch frame 1014. In response to a successful attempt to transmit a synch frame 1014, the synch logic 1013 may modify the value of a transmission window (TW) maintained by the communications device 1010 in, e.g., memory 1011. For example, in some embodiments, upon transmitting a synch frame 1014, synch logic 1013 may decrease the value of the TW. In several embodiments, the synch logic 1014 may determine that the new value of TW equals the current value of TW divided by a constant alpha. In some embodiments, the function may be linear and, in other embodiments, the function may be quadratic. In some embodiments, the value of alpha may be a constant, integer such as 1, 2, 3, 4, . . . . In several embodiments, the value of alpha may be predetermined. In other embodiments, the value of alpha may be adjustable and may be increased in an effort to reduce power consumption or decreased in an effort to reduce discovery timing.

The communications device 1030 may detect the transmission of the synch frame 1014 transmitted by the communications device 1010 during the backoff period of the communications device 1030 during the discovery window 1110. In several embodiments, the synch logic 1033 may determine to terminate the attempt to transmit a synch frame 1034 during the discovery window 1110 in response to detecting the transmission of the synch frame 1014 for the synch network. In response to a terminated attempt to transmit a synch frame 1034, the synch logic 1033 may modify the value of a transmission window (TW) maintained by the communications device 1030 in, e.g., memory 1031. For example, in many embodiments, upon receiving the synch frame 1014, the synch logic 1033 may increase the value of the TW. In some embodiments, the synch logic 1034 may determine that the new value of TW equals the current value of TW divided by a constant beta. In some embodiments, the function may be linear and in other embodiments, the function may be quadratic. In many embodiments, the value of beta may be a constant, integer such as 1, 2, 3, 4, . . . . In several embodiments, the value of beta may be predetermined. In other embodiments, the value of beta may be adjustable and may be increased in an effort to reduce discovery timing within the synch network or reduced to reduce power consumption.

In some embodiments, the synch logic 1013, 1033 may determine the timing for the next attempt to transmit a synch frame 1014, 1034 based upon the new values of TW, respectively. In other words, the communications devices 1010 and 1030 maintain different values of TW to facilitate distribution of the communications devices to different discovery periods to attempt to transmit synch frames 1014, 1034.

In some embodiments, the new value of TW may be implemented in a function to determine the next discovery period in which to attempt to transmit the synch frames 1014, 1034. For instance, the synch logic 1013, 1033 may determine the discovery period as the time of the latest synch frame 1014,1034 timing (t) plus a random number (r) multiplied by the discovery period (T), or t+rT. In some embodiments, the random number may be a random number bounded between a minimum TW and the current value of TW. In other embodiments, a different function may be used to calculate the next discovery period in which to attempt to transmit the synch frame 1014, 1034. For instance, in one embodiment, the next discovery period may be t+(TW)T. In another embodiment, the next discovery period may be t+alpha(TW)T, wherein alpha is a constant that may be an integer or a fraction.

In many embodiments, the calculation for the next discovery period may be adjusted to reduce power consumption or to reduce discovery timing. For instance, modifying the calculation to increase the time period to the next discovery window may reduce power consumption whereas modifying the calculation to decrease the time period to the next discovery window may reduce discovery timing. In several embodiments, the adjustments of calculations of the new TW and the next discovery window can adjust a balance between power reduction and reduction of discovery timing. For instance, if the time period to the next discovery period is larger, the communications device can enter a power-save mode for a longer period of time but remaining in the power-save mode for the longer period of time could increase the probability that a synch frame is not transmitted during one of the intermediate discovery periods, causing other communications devices to wait in an awake mode or active mode for longer periods of time. Similarly, if the time period to the next discovery period is shorter, the communications device can enter a power-save mode for a shorter period of time, which increases power consumption but reduces the probability that a synch frame is not transmitted during one of the intermediate discovery periods.

The communication devices 1010 and 1030 comprise memory 1011 and 1031, and Media Access Control (MAC) sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or frame structures, or portions thereof 1012 and 1032 such as a synch, beacon, device discovery request, device discovery response, service query, service response, permission request, and permission response frames.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. In the present embodiment, for instance, the MAC sublayer logic 1018, 1038 may comprise the synch logic 1013 and 1033 to generate synch frames 1014, 1034 and the data unit builders of the physical layer logic 1019, 1039 may prepend the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises a radio 1025, 1045 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM module, which impresses digital data, OFDM symbols encoded with tones, onto RF frequencies, also referred to as sub-carriers, for transmission of the data by electromagnetic radiation. In the present embodiment, the OFDM module may impress the digital data as OFDM symbols encoded with tones onto the sub-carriers to for transmission. The OFDM module may transform information signals into signals to be transmitted via the radio 1025, 1045 to elements of an antenna array 1024.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIGS. 1B and 1C depict embodiments of a graph for TW versus synch transmission attempts and results of a simulation for different numbers of devices associated with a synch network. That I(x)=x+alpha and D(x)=x/beta. Assuming that N devices are joined in a sync network, and every device can overhear the transmission from all other devices. The evolution of TW before each attempt as shown in FIG. 1B. Let TWi be the window size before ith attempt. At each attempt, assume that a device will transmit the sync frame with probability p, and this probability is independent of the window size. The situation can be characterized as:

$$TWi=(TWi-1/\alpha)1\text{win}+(TWi-1+\beta)1\text{lose}$$

wherein 1win and 1lose are the indicator random variables of winning and losing the transmission. The expectation on both sides provides:

$$E[TWi]=(E[TWi-1]/\alpha)p+(E[TWi-1]+\beta)(1-p).$$

Since in stationary, E[TWi]=E[TWi−1]=E[TW]. We can then show that:

$$E[TW]=\alpha\beta(1/p-1)/(\alpha-1)$$

Furthermore, it is known that the value of p=1/(1+expected number of other attempt devices at a attempt). For a device, when the transmission window is TW, the probability that it attempts at a discovery window is 1/TW, which will be E[1/TW] on average. Since there are N−1 other devices, the expected number of other attempt devices at a discovery window is (N−1)E[1/TW]. Hence:

$$E[TW]=\alpha\beta(N-1)E[1/TW]/(\alpha-1)$$

In accordance with Jensen's inequality, named after the Danish mathematician Johan Jensen: 2(N−1)/E[TW]<=E[TW].

In accordance with Kantrovich's inequality, named after the economist, mathematician, and Nobel Prize winner Leonid Kantorovich:

$$E[TW]<=2(N-1)((a+b)^2)/(4abE[TW])$$

Wherein a and b is the minimum and maximum of the window size. Since a=1, and the upper bound can be approximated as:

$$E[TW] <= 2(N-1)b/(4E[TW])$$

As a result:

$$SQRT(\alpha\beta(N-1)/(\alpha-1)) <= E[TW] <= SQRT(\alpha\beta(N-1)b/((\alpha-1)4))$$

FIG. 1B illustrates values for these equations as well as the expected TW, E[TW], for different numbers of devices (N) with alpha ($\alpha$) equal to one and beta ($\beta$) equal to 2. For instance, for a synch network with 75 devices (N=75), the expected average value for TW is 16 (E[TW]=16) and for a network with 150 devices (N=150), the expected value of TW is 22.98 (E[TW]=22.98) as illustrated in the table. Since the values for TW always increase or decrease in response to attempts to transmit a synch frame, the expected values of TW may be expected average values while the actual values should rise to near that expected values and reach a steady-state that has an average of approximately the expected value. Note that these values are based on the assumptions discussed above.

Figure 2:
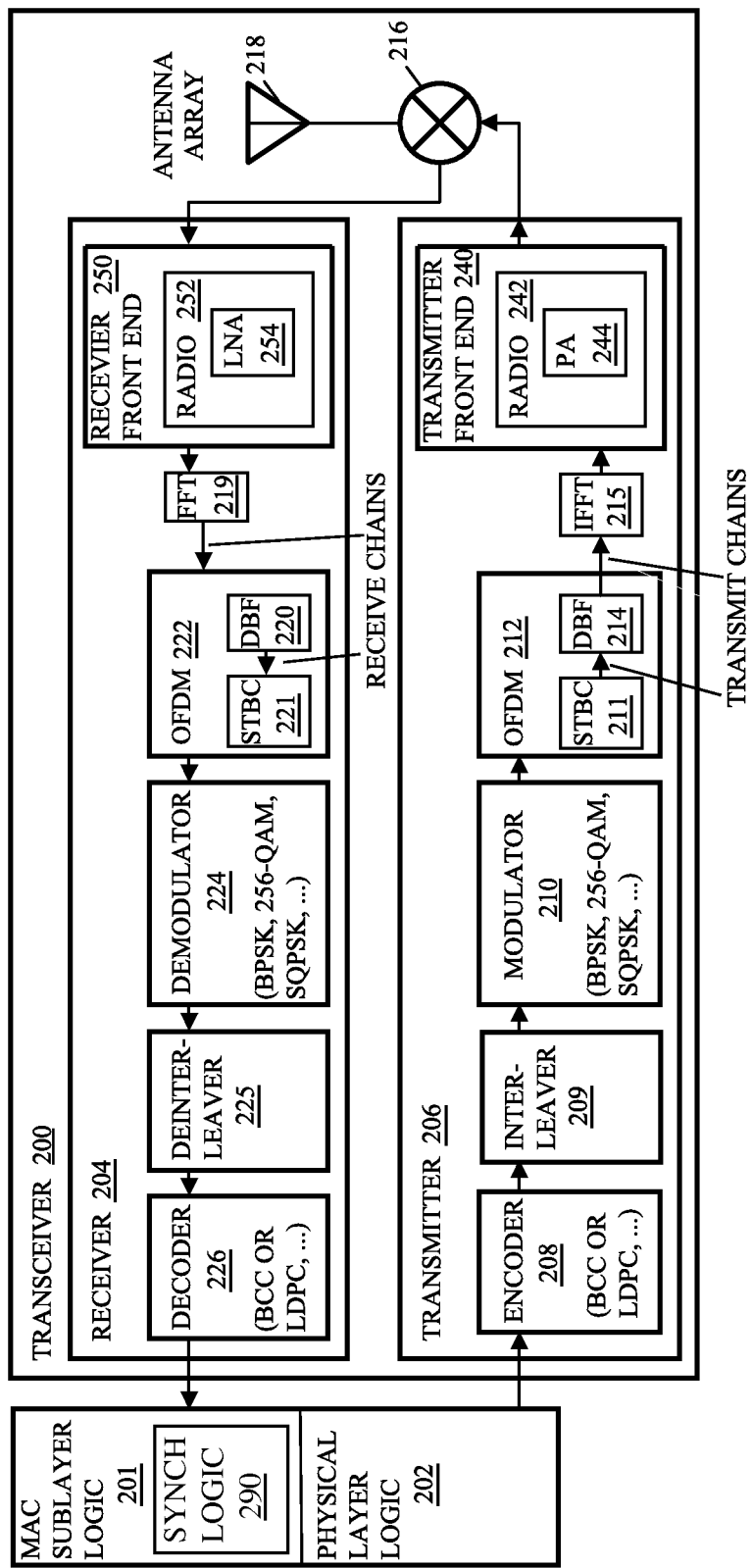
FIG. 2 depicts an embodiment of an apparatus to generate, transmit, receive and interpret frames for communications between wireless communication devices.

FIG. 2 depicts an embodiment of an apparatus to generate, transmit, receive, and interpret frames such as synch frames, beacon frames, device discovery request/response frames, permission request/response frames, synch frames, and other P2P related frames. The apparatus comprises a transceiver 200 coupled with Medium Access Control (MAC) sublayer logic 201. The MAC sublayer logic 201 may determine a frame and the physical layer (PHY) logic 202 may determine the PPDU by prepending the frame or multiple frames, MAC protocol data units (MPDUs), with a preamble to transmit via transceiver 200.

In many embodiments, the MAC sublayer logic 201 may comprise a frame builder to generate frames and a synch logic 290 such as the synch logic 1014 and 1034 described in conjunction with FIG. 1 to loosely manage synch frame transmissions by the MAC sublayer logic 201 to distributedly adjust the frequency of the synch frame transmissions based upon the number of devices in a synch network without determining the number of devices in the synch network (or the size of the neighborhood). The PHY logic 202 may comprise a data unit builder 203. The data unit builder 203 may determine a preamble to prepend the MPDU or more than one MPDUs to generate a PPDU. In many embodiments, the data unit builder 203 may create the preamble based upon communications parameters chosen through interaction with a destination communications device. The preamble may comprise training sequences such a short training field (STF) and a long training field (LTF) to provide initial channel updates to the receiving device to allow the receiving device to update weight coefficients for a weighting function implemented by an equalizer in the receiving device.

The transceiver 200 comprises a receiver 204 and a transmitter 206. The transmitter 206 may comprise one or more of an encoder 208, an interleaver 209, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 210 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 210 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols. The output of the IFFT module 215 may enter the transmitter front end 240. The transmitter front end 240 may comprise a radio 242 with a power amplifier (PA) 244 to amplify the signal and prepare the signal for transmission via the antenna array 218. In some embodiments, the radio may not comprise a power amplifier 244 or may be capable of bypassing the power amplifier 244 if such amplification is unnecessary. The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals such as synch frames transmitted by other stations. The receiver 204 may comprise a receiver front-end 250 to detect the signal, detect the start of the packet, remove the carrier frequency, and amplify the subcarriers via a radio 252 with a low noise amplifier (LNA) 254. The communication signals may comprise, e.g., 32 tones on a 1 MHz carrier frequency. The receiver 204 may comprise a fast Fourier transform (FFT) module 219. The FFT module 219 may transform the communication signals from the time domain to the frequency domain.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TXVECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU based upon a format defined in the communications device for a frame to determine the particular type of frame by determining the type value and the subtype value. The MAC sublayer logic 201 may then parse and interpret the remainder of MPDU based upon the definition for the frame of the particular type and subtype indicated in the MAC header. For instance, if the frame is a management frame such as a synch frame, the frame body may include parameters to set for communication preferences for the source station of the transmission. Based upon the receipt of the synch frame, the synch logic 290 may determine to terminate the attempted transmission of a synch frame during the same discovery window and adjust the value of TW to account for the terminated attempt.

Figure 3:
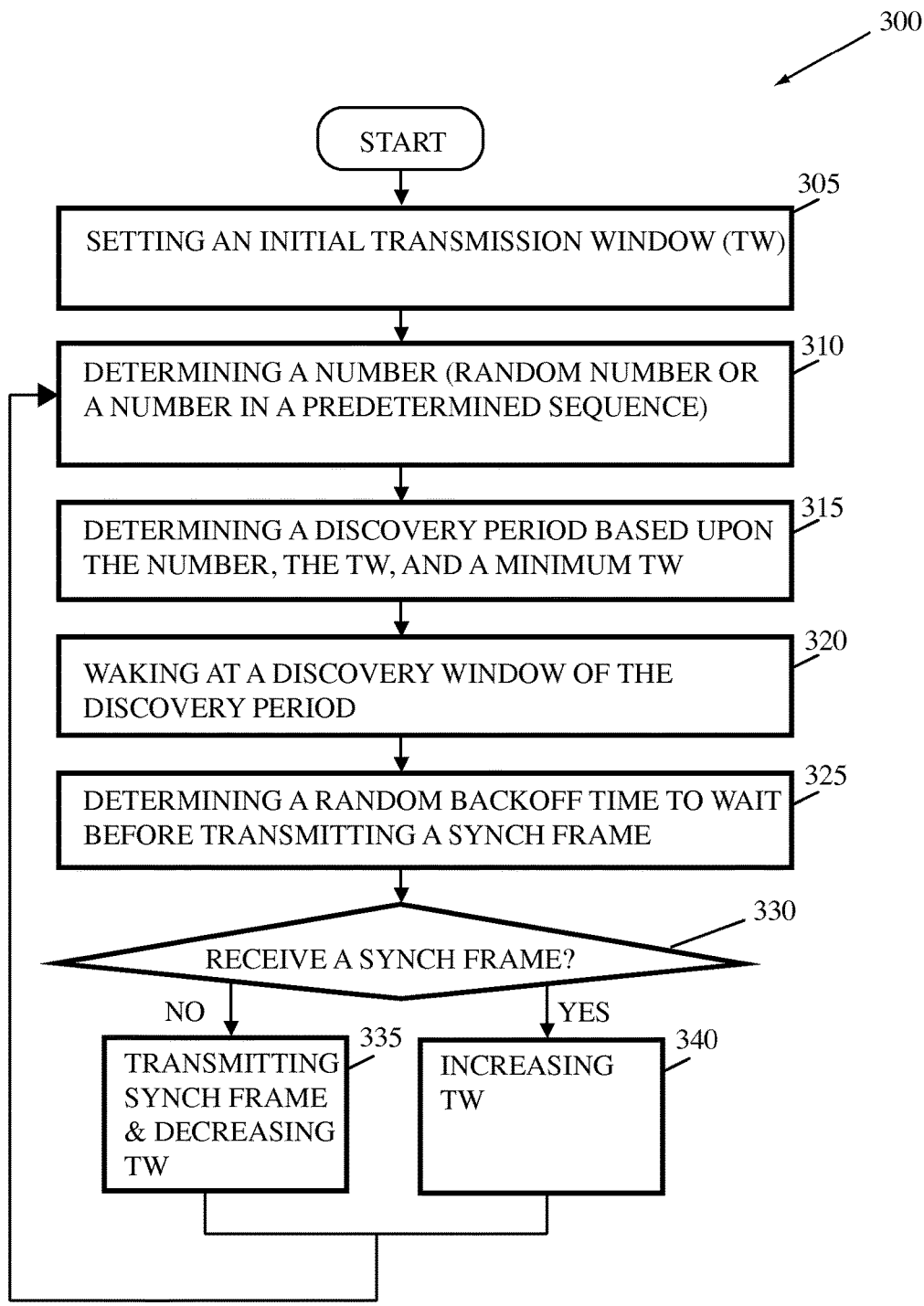
FIG. 3 depicts an embodiment of a flowchart to determine a transmission window and a subsequent discovery period in which to attempt to transmit a synch frame.

FIG. 3 illustrates an embodiment of a flowchart 300 by which synch logic may manage the attempted synch transmission of a device in a synch network. The flowchart 300 begins with setting an initial transmission window (TW) (element 305). In some embodiments, the device may comprise a default initial setting for TW that may be used when the device first synchs with a synch network. In further embodiments, the device may receive a default value for TW via, e.g., a beacon frame, synch frame, or other management frame.

After setting the initial value of TW, the synch logic may determine a selection number (element 310). For instance, the selection number may be a number used to select a time to the next discovery period in which the device may attempt to transmit a synch frame. The synch logic may determine the selection number by, e.g., determining a random number bounded between a minimum TW such as 1 discovery period and the current value of TW. In such embodiments, the random number may represent a number of discovery periods and may be multiplied by the discovery period to determine an amount of time to wait before the next discovery period (element 315). In further embodiments, the selection number may be a number chosen from a predetermined sequence of numbers between a minimum TW such as 1 discovery period and the current value of TW (element 315). The predetermined sequence of numbers may be designed to facilitate distribution of duties to attempt to transmit a synch frame amongst devices in the synch network.

Once the synch logic determines the time period to the next discovery period to attempt to transmit a synch frame, the device may enter a power-save mode and awake at the discovery window of the discovery period (element 320). For instance, the device may be a low power device that operates on battery power so the device may preserve power by entering the power-save mode until just before the discovery period.

Upon awaking from the power-save mode, the synch logic may determine a backoff period to wait during a discovery window of the discovery period prior to transmitting the synch frame (element 325). In many embodiments, the backoff period may be a random time period.

If the device receives a synch frame from another device in the same synch network, the synch logic may increase the value of TW (element 340) and proceed to element 310 to repeat the process starting with determining a selection number. On the other hand, if the device does not receive a synch frame from another device in the same synch network during the backoff period, the synch logic may transmit a synch frame and decrease the value of TW (element 335). After decreasing the value of TW, the synch logic may repeat the process starting with determining a selection number at element 310.

Figure 4A:
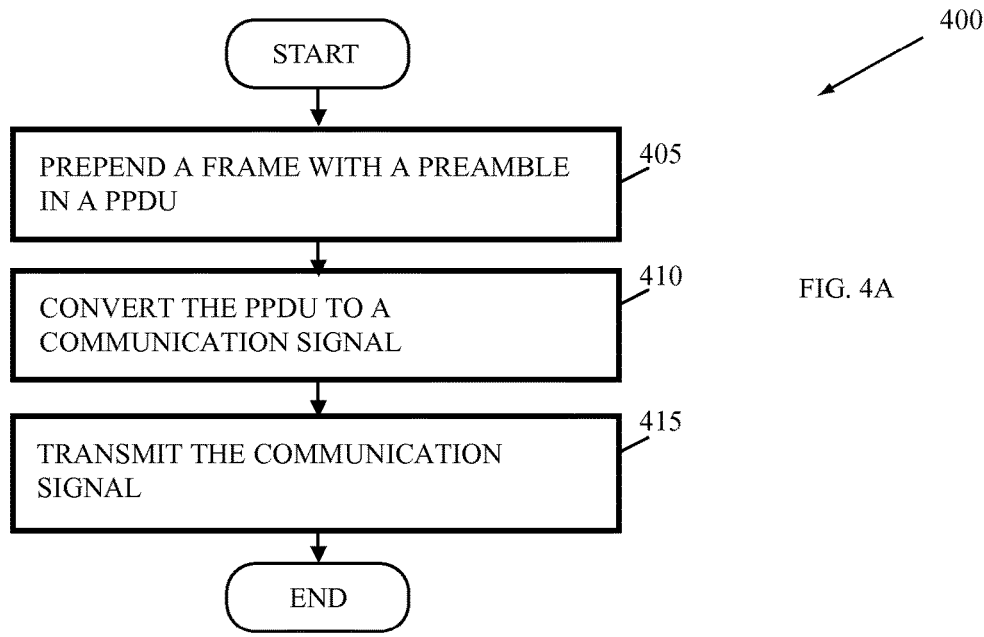
FIGS. 4A-B depicts other embodiments of flowcharts to generate, transmit, receive and interpret frames for communications between wireless communication devices.
Figure 4B:
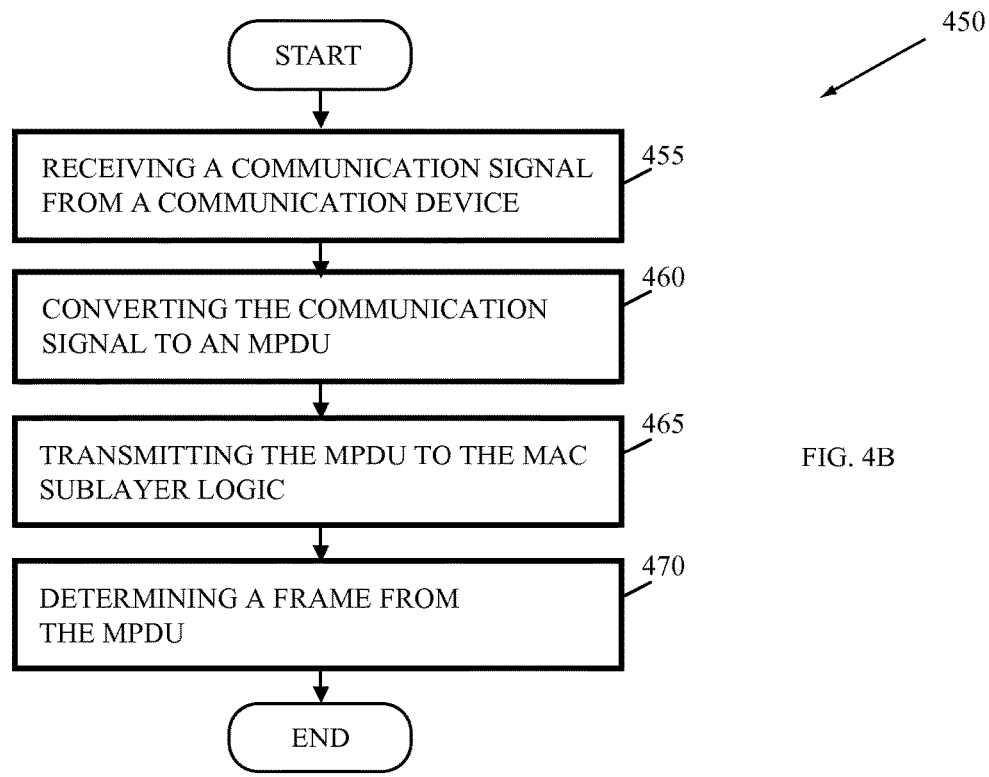

FIGS. 4A-B depict embodiments of flowcharts 400 and 450 to transmit, receive, and interpret communications with a frame. Referring to FIG. 4A, the flowchart 400 may begin with receiving a synch frame from the synch logic of the MAC sublayer logic. The MAC sublayer logic of the communications device may generate the frame as a management frame to transmit to other devices of a synch network and may pass the frame as an MAC protocol data unit (MPDU) to a PHY logic that transforms the data into a packet that can be transmitted to the access point. The PHY logic may generate a preamble to prepend the PHY service data unit (PSDU) (the MPDU from the frame builder) to form a PHY protocol data unit (PPDU) for transmission (element 405). In some embodiments, more than one MPDU may be included in a PPDU.

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of a device in a synch network such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine frame field values from the MPDU (element 470) such as the management frame fields. For instance, the MAC sublayer logic may determine frame field values such as the type and subtype field values of the synch frame. Synch logic of the MAC sublayer logic may determine that the MPDU comprises a synch frame so the synch logic may terminate an attempt to transmit a synch frame by the device. In many embodiments, the synch logic may then update a value of the transmission window (TW) based upon the terminated attempt to transmit the synch frame and determine the next discovery period in which the device may attempt to transmit a synch frame.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for establishing application session based secure peer-to-peer links. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
   determining, by a first station, a first value for a transmission window, wherein each value for the transmission window represents a number of discovery periods to wait between attempts to transmit a first frame during a discovery window;
   determining, by the first station, a selection number to determine a discovery period, within the transmission window, during which to attempt to transmit the first frame during the discovery window, wherein the selection number comprises an integer bounded by the first value of the transmission window;
   determining, by the first station, a backoff period to wait during the discovery window of the discovery period;
   determining, by the first station, if a second frame is received by the first station from another station during the backoff period;
   if the second frame is received by the first station during the backoff period, terminating, by the first station, the transmission of the first frame during the discovery window and increasing, by the first station, the first value for the transmission window; and
   if the second frame is not received by the first station during the backoff period, transmitting, by the first station, the first frame during the discovery window and decreasing, by the first station, the first value for the transmission window.

2. The method of claim 1, wherein decreasing the first value for the transmission window comprises setting the different value for the transmission window equal to the first value for the transmission window divided by a constant.

3. The method of claim 1, wherein determining the first value for the transmission window comprises accessing memory to determine the first value.

4. The method of claim 1, wherein determining, by the first station, the selection number comprises determining a random selection number.

5. The method of claim 1, wherein determining, by the first station, the selection number comprises determining the selection number from a predetermined sequence of selection numbers.

6. The method of claim 1, wherein determining, by the first station, the backoff period comprises determining a random backoff time in a range of a minimum backoff time though a maximum backoff time.

7. The method of claim 1, wherein determining if the second frame is received comprises receiving and decoding the frame.

8. The method of claim 1, wherein increasing the first value for the transmission window comprises setting a new value for the transmission window equal to the first value for the transmission window plus a constant.

9. A device comprising:
   a memory; and
   a medium access control logic coupled with the memory to determine a first value for a transmission window, wherein each value for the transmission window represents a number of discovery periods to wait between attempts to transmit a first frame during a discovery window; determine a selection number to determine a discovery period, within the transmission window, during which to attempt to transmit the first frame during the discovery window, wherein the selection number comprises an integer bounded by the first value of the transmission window; determine a backoff period to wait during the discovery window of the discovery period; determine if a second frame is received from a station during the backoff period; if the second frame is received by the first station during the backoff period, terminate the transmission of the first frame during the discovery window and increase the first value for the transmission window; and, if the second frame is not received by the first station during the backoff period, transmit the first frame during the discovery window and decrease the first value for the transmission window.

10. The device of claim 9, further comprising a radio coupled with the medium access control logic to transmit the frame.

11. The device of claim 9, wherein the medium access control logic comprises logic to decrease the first value for the transmission window comprises logic to set a new value for the transmission window equal to the first value for the transmission window divided by a constant.

12. The device of claim 9, wherein the medium access control logic to determine if the second frame is received comprises logic coupled with a physical layer logic to receive the frame.

13. The device of claim 9, wherein the medium access control logic to increase the first value for the transmission window comprises setting a new value for the transmission window equal to the first value for the transmission window plus a constant.

14. A system comprising:
   a radio coupled with a physical layer logic; and
   a medium access control logic coupled with the physical layer logic to determine a first value for a transmission window, wherein each value for the transmission window represents a number of discovery periods to wait between attempts to transmit a first frame during a discovery window; determine a selection number to determine a discovery period, within the transmission window, during which to attempt to transmit the first frame during the discovery window, wherein the selection number comprises an integer bounded by the first value of the transmission window; determine a backoff period to wait during the discovery window of the discovery period; determine if a second frame is received from a station during the backoff period; if the second frame is received by the first station during the backoff period, terminate the transmission of the first frame during the discovery window and increase the first value for the transmission window; and, if the second frame is not received by the first station during the backoff period, transmit the first frame during the discovery window and decrease the first value for the transmission window.

15. The system of claim 14, further comprising an antenna coupled with the radio to receive the frame.

16. The system of claim 15, wherein the medium access control logic comprises logic comprises logic to decrease the first value for the transmission window based upon transmitting the frame.

17. The system of claim 14, wherein the medium access control logic comprises logic to set a new value for the transmission window equal to the first value for the transmission window plus a constant.

18. The system of claim 14, wherein the medium access control logic to increase the first value for the transmission window by setting a new value for the transmission window equal to the first value for the transmission window plus a constant.

19. A program product to establish an application session based peer-to-peer link, the program product comprising:

a non-transitory storage medium comprising instructions to be executed by a processor-based device, wherein the instructions, when executed by the processor-based device, perform operations, the operations comprising:

determining, by a first station, a first value for a transmission window, wherein each value for the transmission window represents a number of discovery periods to wait between attempts to transmit a first frame during a discovery window;

determining, by the first station, a selection number to determine a discovery period, within the transmission window, during which to attempt to transmit the first frame during the discovery window, wherein the selection number comprises an integer bounded by the first value of the transmission window;

determining, by the first station, a backoff period to wait during the discovery window of the discovery period;

determining, by the first station, if a second frame is received by the first station from another station during the backoff period;

if the second frame is received by the first station during the backoff period, terminating, by the first station, the transmission of the first frame during the discovery window and increasing, by the first station, the first value for the transmission window; and if the second frame is not received by the first station during the backoff period, transmitting, by the first station, the first frame during the discovery window and decreasing, by the first station, the first value for the transmission window.

20. The program product of claim 19, wherein the operations further comprise determining the first value for the transmission window by accessing memory to determine an initial value for the transmission window.

21. The program product of claim 19, wherein determining if the second frame is received comprises receiving and decoding the second frame.

* * * * *